United States Patent [19]

Roeder et al.

[11] Patent Number: 4,985,192

[45] Date of Patent: Jan. 15, 1991

[54] METHODS AND APPARATUS FOR PRODUCING FASTENER PROFILES, AND PRODUCTS INCORPORATING THE SAME

[75] Inventors: Ronald W. H. Roeder, London; Geoffrey Brighton, N. Yorks, both of England

[73] Assignee: Roeder Industrial Holdings Limited, London, England

[21] Appl. No.: 342,364

[22] Filed: Apr. 20, 1989

[30] Foreign Application Priority Data

Apr. 21, 1988 [GB] United Kingdom ................. 8809401

[51] Int. Cl.⁵ .............................................. B29C 47/20
[52] U.S. Cl. ................... 264/177.1; 156/66; 156/244.15; 156/244.25; 156/500; 264/564; 264/209.8; 425/380; 425/382.4; 425/461
[58] Field of Search .............. 264/177.1, 209.1, 209.8, 264/564, 565, 566; 425/131.1, 133.5, 380, 461, 382.4; 156/66, 244.15, 244.25, 500

[56] References Cited

U.S. PATENT DOCUMENTS

| | | | |
|---|---|---|---|
| 3,233,286 | 2/1966 | Batosti et al. | 264/167 |
| 3,520,963 | 7/1970 | Allseits et al. | 264/209.4 |
| 3,579,730 | 5/1971 | Ausnit | 264/565 |
| 3,597,795 | 8/1971 | Naito | 264/565 |
| 3,841,816 | 10/1974 | Herz | 425/326.1 |
| 4,295,919 | 10/1981 | Sutrina et al. | 156/244.25 |
| 4,515,647 | 5/1985 | Behr | 156/500 |
| 4,561,109 | 12/1985 | Herrington | 264/177.1 |
| 4,701,358 | 10/1987 | Behr et al. | 428/99 |
| 4,778,282 | 10/1988 | Borchardt et al. | 156/66 |
| 4,822,539 | 4/1989 | Tilman et al. | 264/209.8 |

FOREIGN PATENT DOCUMENTS

| | | |
|---|---|---|
| 0155612 | 9/1985 | European Pat. Off. . |
| 0223125 | 5/1987 | European Pat. Off. . |
| 2133462A | 7/1984 | United Kingdom . |
| 2133462 | 7/1984 | United Kingdom . |

*Primary Examiner*—Jeffery Thurlow
*Attorney, Agent, or Firm*—Young & Thompson

[57] ABSTRACT

An extrusion die for producing a fastener profile having a male profile portion and an alignment rib spaced on each side thereof has a first peripheral slot to produce the male profile portion and second and third slots to produce the ribs. By inclining the axes of the second and third slots relative to the first slot, preferably at respective different angles, one can remove the tendency for the male profile portion to tilt or roll and reduce lateral stresses set up during the extrusion process. The thermoplastic material is fed to each of the three slots separately, and preferably at a pressure to the second and third slots which is greater than to the first slot.

12 Claims, 2 Drawing Sheets

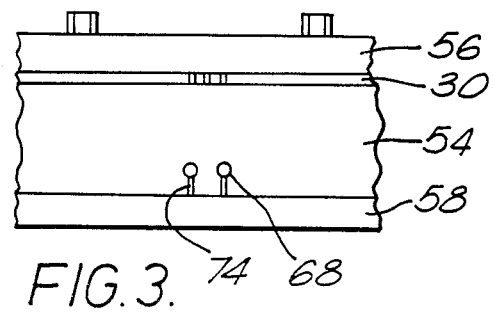
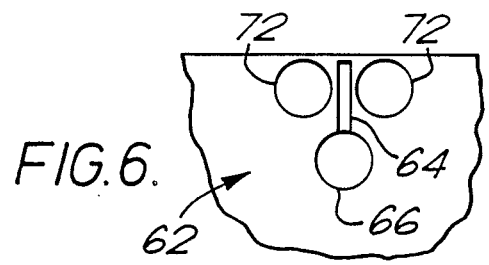
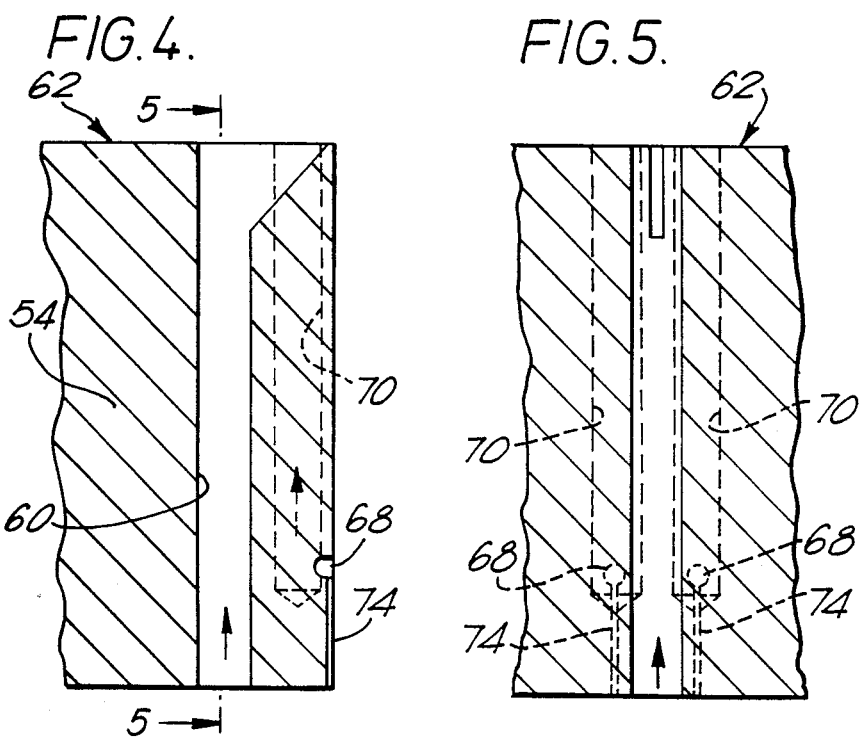

ically extruded fastener profiles for reclosable containers or bags it is known to provide ribs or ridges on each side of the male profile part. These ribs are intended to provide two particular advantages. The first is to make it easier to close the profile, especially on wider-mouthed bags, because the rib said the alignment of the male and female parts of the profile. The second is to give the profile a more pleasant "feel".
METHODS AND APPARATUS FOR PRODUCING FASTENER PROFILES, AND PRODUCTS INCORPORATING THE SAME

FIELD OF THE INVENTION

This invention relates variously to:
(a) a film or sheet having integrally extruded fastener profiles;
(b) a reclosable container or bag formed from such film or sheet;
(c) a closure for containers or bags made from a plastics film or sheet and comprising complementary interlocking profiles;
(d) a method of forming integral reclosable fastener profiles on flexible film or sheet to be made into containers or bags;
(e) a method of forming integral fastener profiles on separate film strips which can then be adhered to a film or sheet for use in making a reclosable container or bag; and
(f) a method of and apparatus for controlling the spacing and orientation of alignment ribs in a fastener profile for a reclosable container or bag.

BACKGROUND TO THE INVENTION

In the manufacture of integrally extruded fastener profiles for reclosable containers or bags it is known to provide ribs or ridges on each side of the male profile part. These ribs are intended to provide two particular advantages. The first is to make it easier to close the profile, especially on wider-mouthed bags, because the rib said the alignment of the male and female parts of the profile. The second is to give the profile a more pleasant "feel".

UK Patent GB No. 2133462B describes closures incorporating zipper-like fastener elements which incorporate protuberances, ribs or ridges adjacent to the male profile. The primary feature of that invention is concerned with spacing the ribs a predetermined distance on either side of the male profile in order to overcome the problems of stresses experienced in the film in the extrusion process which tend to draw the ribs apart from the profile.

U.S. Pat. No. 4701358 describes the manufacture of thermoplastic film with integral closures where again the male profile has additional ribs on each side thereof. In that specification reference is again made to the problems of lateral stresses and lateral shifting of the ribs relative to the male profile, and also to the problem of tipping or tilting of the male profile and the associated ribs, again due to lateral stresses in the film. In U.S. No. 4701358 it is sought to compensate for this tilting by the use of modified manufacturing techniques.

A particular and on-going problem, particularly with large bags or well-filled bags, is the difficulty of accurately aligning the male and female profiles when one is attempting to close the bag.

SUMMARY OF THE INVENTION

It is therefore one object of the present invention to provide a closure based upon complementary interlocking profiles which is easier to close, particularly with large bags or well-filled bags.

It is a further object of the present invention to provide a closure which is constructed so that it obviates the tendency of the profile to tilt or roll.

It is a further object of the present invention to provide a closure based upon complementary interlocking profiles where the male profile portion is unable to roll because of alignment ribs provided on each side thereof, such ribs having a particular position and orientation.

It is yet another object of the present invention to provide an improved method of manufacturing fastener profiles for containers or bags which overcomes or reduces the problems associated with the lateral stresses which are set up in the film during the extrusion process.

It is a further object of the present invention to provide apparatus which enables the extrusion of fastener profiles integral with film or sheet material, or with separate film strips, such apparatus incorporating a die designed to improve the flow of plastics material in a manner which overcomes or reduces the problems of lateral stress arising in the extrusion process.

The present invention is based upon a realisation that in order to achieve the objects set out above it is necessary that the die which produces the extruded male fastener profile and associated alignment ribs must be specially configured, and in particular that the orientation, spacing and dimensions of the holes in the die which produce the male profile part and the associated ribs is particularly significant.

By using a specially shaped die, and by carrying out the extrusion process in a manner in accordance with the invention, it is possible to create integrally extruded fastener profiles where the alignment ribs are of the desired shape and are at the right distance apart, where the complementary interlocking profiles are stable upon closing, and where the thickness of the film or sheet material in the zones between the male profile part and the lateral alignment ribs is of substantially the same thickness as the rest of the film or sheet.

Broadly in accordance with one aspect of the present invention this is achieved by using a die where the slots for the alignment ribs are set at inclined angles relative to the slot for the male profile. Preferably, the two alignment ribs are set at respective different angles relative to the male profile.

Broadly in accordance with another aspect of the present invention, the achievement of the aforesaid objects is enhanced by the use of a die having said angled slots for the alignment ribs arranged so that the shortest distance between each slot and the adjacent barb on the male profile is the same on each side of the male profile. This is important in order to stop the male profile tilting one way or the other when the male and female profiles are brought together on closing.

According to another aspect of the present invention it is important that, in a die as aforesaid with angled slots for the alignment ribs, there should be a predetermined distance on each side of the base of the male profile slot between that male profile slot and the respective slots for the alignment ribs. The dimensions of the slot-to-slot spacings where the male profile and ribs meet the film or sheet material is important in order to give control over the final configuration of the closure.

Broadly in accordance with a further aspect of the present invention the achievement of the aforesaid objects is due to the utilization of a method of extrusion in which plastics material is fed separately for each of the three slots in the die, namely the slots for the male profile and for the two alignment ribs. Preferably, additional material over and above what might be expected is introduced into the slots for the ribs. The provision of additional material reduces the problems associated with spreading effects. It also prevents any tendency for the alignment ribs to be positioned too far from the male profile in the finished product.

This introduction of additional plastics material to the die slots is preferably carried out, in the case of the slots for the alignment ribs, by the use of pin gates, whereby the volume of material flowing through the pin gates to the slots for the alignment ribs can be varied and controlled.

BRIEF DESCRIPTION OF THE DRAWINGS

In order that the invention may be more fully understood, reference is now made to the following more detailed description which is given by way of example and by reference to the accompanying drawings, in which:

FIG. 3 is a partial side view, viewed from externally, of a die ring or nozzle in accordance with the invention;

FIG. 4 is a partial, vertical sectional view through the lower part of the die ring;

FIG. 5 is a sectional view taken generally along the line 5—5 in FIG. 4; and

FIG. 6 is a plan view of that part of the upper surface of the lower part of the die ring immediately beneath the slots in the upper part of the die ring.

DESCRIPTION OF THE PREFERRED EMBODIMENT

Figure 2:
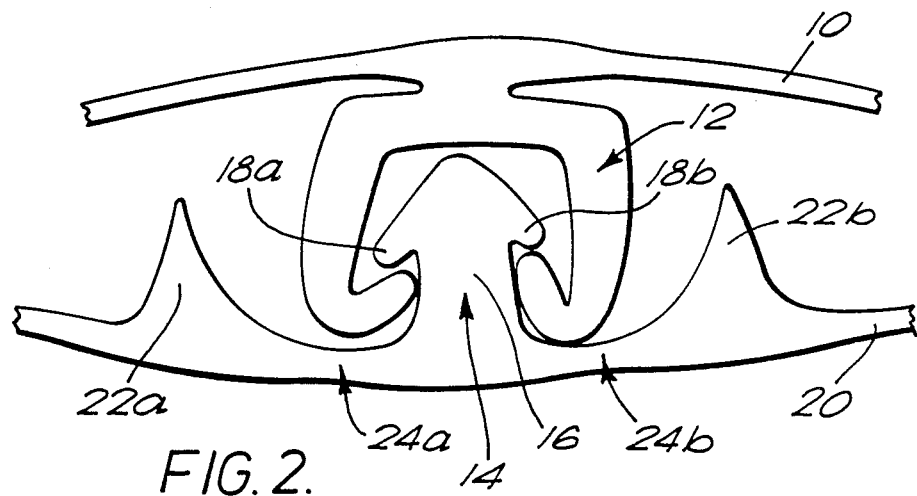
FIG. 2 shows a typical extrusion produced from the die shown in FIG. 1, and also showing the associated female fastener profile.

Referring first to FIG. 2, this shows an example of an extrusion in accordance with the invention. A first film 10 of thermoplastic material carries a female closure profile 12. This interlocks with a male closure profile, indicated generally at 14, and which comprises a stem 16 and barbs 18a and 18b. The male profile 14 is upstanding from a film or sheet 20 of thermoplastic material. Alignment ribs 22a and 22b are provided, one on each side of the male profile 14.

The important features of this configuration, in terms of achieving the objects of the invention as set out above are the following. The height of the ribs 22a, 22b must not be too high, i.e. must be lower than the height of the male profile 14, otherwise pressure is exerted on the alignment ribs, not just on the male profile, when closing the male and female profiles together. It is also important that the male profile 14 should have asymmetrical barbs 18a and 18b, i.e. one barb longer than the other. By having barbs of different lengths, the finished container or bag is thereby made easier to open from the outside, but more difficult to open from the inside, i.e. it is resistant to the contents forcing the container or bag open. It is also desirable that the thickness of the film 20 in the zones, indicated at 24a and 24b, between the male profile 1 4 and the alignment ribs should be approximately the same thickness as the rest of the film or sheet material 20. This aids closing of the male and female profiles. It is also important that the alignment ribs 22a and 22b should be positioned at the correct distance from the central male profile 14. It is also important that the male profile 14 should be such that it does not tilt one way or the other when the male and female fastener elements are brought together. It is also important that the alignment ribs also should not tilt, either when the fastener elements are brought together for interlocking closure or in the "standby" condition.

Figure 1:
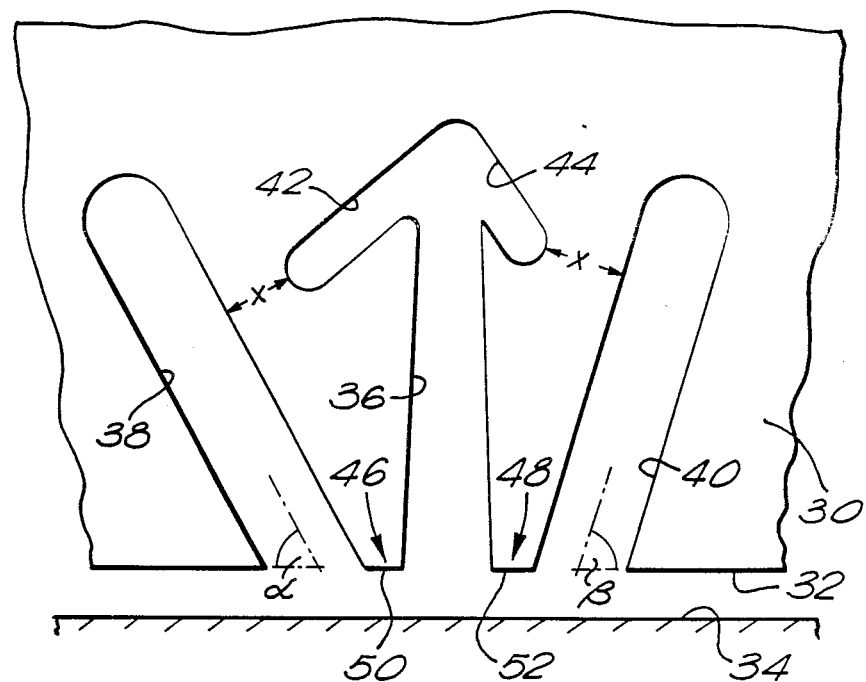
FIG. 1 is a view of part of an extrusion die, illustrating the preferred configuration and orientation of the slots for the male profile and alignment ribs.

An extrusion having the configuration shown in FIG. 2 and which takes into account the aforesaid features of importance can be produced by the use of a die or nozzle as shown in FIG. 1. The relevant part of the die ring is indicated at 30 and the curved peripheral surface of the die ring is indicated at 32. This curved surface 32 is shown in the drawing as a straight line. The correspondingly curved internal peripheral surface of an outer sizing ring which encircles the die ring is indicated at 34. The thermoplastic film passes, in the extrusion process, in the gap between surfaces 32 and 34. As shown in FIG. 1, the die ring 30 is provided with three cut-out slots. A central slot indicated generally at 36 defines the male profile 14, a first linear slot 38 defines alignment rib 22a, and a second linear slot 40 defines alignment rib 22b. The central slot 36 includes extensions 42 and 44 at respective sides of the inward end of the slot, which define the barbs 18a and 18b on the male profile. It will be noted that the slots 38 and 40 for the alignment ribs are each set at an inclined angle relative to the central slot 36. It has been found that if one uses lateral slots which are set perpendicular to the plane of the film, i.e. which are parallel to the central slot 36, then one has problems of "spread" of material at the zones 46 and 48 between the bases of the respective slots. It is therefore essential to the present invention that inclined slots are used for the lateral ribs.

The particular angles at which the slots 38 and 40 are set is also important. In the preferred embodiment slot 38 is set at an angle $\alpha$ of 62°±1°, and slot 40 is set at an angle $\beta$ of 73°±1°.

It is a further important feature of the configuration of the die slots that the distance, indicated at x, between the end of the central slot extensions 42 and 44 and the adjacent linear edge of the lateral slots 38 and 40 is the same for each side of the profile. This is important in order to stop the male profile tilting one way or the other upon closure. It is also important that the separation x between the respective slots is sufficiently large to prevent attraction occurring between the thermoplastic material of the ribs and of the male profile.

It is also important in the configuration of the die slots that there should be a separation between the base of the male profile slot 36 and the base of the rib slots 38 and 40. This is achieved by the provision of a length of die wall surface 50 and 52 respectively on each side of the outer end of the central slot 36. The length of these wall portions 50,52 in a circumferential direction is important in order to give control over the final configuration of the fastener profile. They are also important in order to prevent material spreading back to the male profile 14 from the high pressures which are generated in the lateral slots 38 and 40, as will become apparent hereinafter. The dimensions of the wall surfaces 50 and 52 are a primary determining factor in the spacing of each alignment rib 22a, 22b from the central male profile 14.

The length of the lateral slots 38 and 40 determines the height of the respective alignment ribs 22a and 22b. It is important that the lateral slots should be sufficiently long to allow sufficient thermoplastic material to be passed to gain the desired height for the alignment ribs, while yet allowing material to spread and join with the base of the profile.

It has been mentioned above that one of the problems of conventional extrusion processes to produce integrally extruded fastener profiles is in connection with the problems of lateral stresses in the extrusion product, and in particular where the male profile and alignment ribs meet the film. In accordance with the present invention this problem is minimized or even eliminated by feeding the thermoplastic material to each of the three slots individually, and in particular by introducing more thermoplastic material than might otherwise be expected to the lateral slots 38 and 40 which define the alignment ribs. FIGS. 3 to 6 illustrate how this is achieved. As shown in FIG. 3, the die ring 30 constitutes an upper part of a two-part die, the lower part of which is indicated at 54. The two die rings 30, 54 are clamped between upper and lower plates 56 and 58 which are of lesser diameter than the die ring parts 30, 54. As shown most clearly in FIGS. 4 to 6, the central slot 36 for the male profile is fed through a vertical channel 60 which extends the full depth of the lower part 54 of the die ring. At the upper surface 62 of the lower part of the die ring the channel 60 has the configuration shown in FIG. 6, i.e. a rectangular stem portion 64 and a circular inner portion 66. The rectangular portion 64 feeds the stem of the slot 36 and the circular portion 66 feeds the radially inward portion of the slot 36 which includes the extension arms 42 and 44 for the barbs. In order to minimise the effects of stress occurring in the zones 46 and 48 (FIG. 1) the thermoplastic material is supplied under extra pressure to the radially outward ends of the lateral slots 38 and 40. This is achieved by the use of pin gates 68 which are provided in the external face of the lower part 54 of the die ring. These pin gates 68 communicate by way of vertical channels 70 in the die ring with circular apertures 72 in the surface 62, which feed the respective bases of the lateral slots 38 and 40. Shallow vertical grooves 74 are provided in the outer surface of the lower part 54 of the die ring, connecting with the pin gates 68. The volume of thermoplastic material flowing through the pin gates 68 to the lateral slots is controlled by the back pressure between the outer sizing ring and die ring. With a constant back pressure one can vary the volumetric flow through the pin gates 68 by altering the size of the grooves 74. In feeding material to the base of the respective lateral slots 38 and 40 the angles of inclination of these lateral slots is important, in that by angling the slots the material under pressure is directed towards the base of the profile and, upon stretch, the alignment ribs are then enabled to attain an upright position as shown in FIG. 2. In order to prevent excessive spread of the very hot thermoplastic material, cooling is preferably provided at the base of the slot area. This can be by air jet for example.

It is emphasized that the particular configuration of die slots described above is given by way of example only and that that aspect of the invention is not to be regarded as limited to the particular details given. The invention also includes completed containers or bags formed from film or sheet incorporating the fastener profiles of the present invention. It also includes a two-part closure for containers or bags comprising a pair of complementary interlocking profiles.

We claim:

1. An extrusion die for producing a fastener profile having a male profile portion and an alignment rib spaced on each side thereof, the die having a first peripheral slot to produce the male profile portion and second and third peripheral slots spaced from said first slot to produce said alignment ribs, wherein said second and third slots are elongated rectilinear slots with parallel sides and the lengthwise axes of said second and third slots are both inclined relative to the lengthwise axis of said first slot, diverging in the direction away from the die periphery.

2. A die as claimed in claim 1, in which said second and third slots are at respective different angles relative to the first slot.

3. A die as claimed in claim 2, in which the angle between the lengthwise axes of said second and first slots is 62°±1° and the angle between the lengthwise axes of said third and first slots is 73°±1°.

4. A die as claimed in claim 1, in which said first slot has a stem portion and a lateral extension on each side of the stem portion to produce a barb on the male profile portion of the fastener profile, wherein the shortest distance between the end of the lateral extension and the respective adjacent second or third slot is the same for each lateral extension.

5. A die as claimed in claim 1, in which the peripheral die apertures which define the ends of said second and third slots are each spaced a distance from the peripheral die aperture which defines the end of said first slot sufficient to produce a thickness of extruded material in the zones between the ribs and the male profile portion of the profile which is substantially equal to the thickness of the sheet or film which bears the profile.

6. A die as claimed in claim 1, which includes passage means to enable thermoplastic material to be fed to each of said first, second and third slots individually.

7. A die as claimed in claim 6, which includes a first passage feeding said first slot, said first passage terminating adjacent to the slot in a mouth having a rectangular portion and a circular portion overlying the closed end of said first slot.

8. A die as claimed in claim 7, which includes second and third passages feeding said second and third slots respectively, each of said passages terminating adjacent to the respective slot in a circular mouth.

9. A die as claimed in claim 6, in which the passage means to feed material to said second and third slots includes, for each slot, a peripheral groove in the outer surface of the die ring, a radial passage from the end of said groove, and a bore from said radial passage to the slot.

10. A method of extruding a fastener profile for a reclosable container or bag, the fastener profile having a male profile portion and an alignment rib spaced on each side thereof, which comprises feeding thermoplastic material through an extrusion die having a first peripheral slot to produce the male profile portion and second and third peripheral slots spaced from said first slot to produce said alignment ribs, wherein said second and third slots are elongated rectilinear slots with parallel sides and the lengthwise axes of said second and third slots are both inclined relative to the lengthwise axis of said first slot, diverging in the direction away from the die periphery.

11. A method as claimed in claim 10, in which thermoplastic material is fed separately to each of said first, second and third slots in the die.

12. A method as claimed in claim 10, in which the thermoplastic material fed to said second and third slots is at a higher pressure than the material fed to said first slot.

* * * * *